Figures 1, 4:
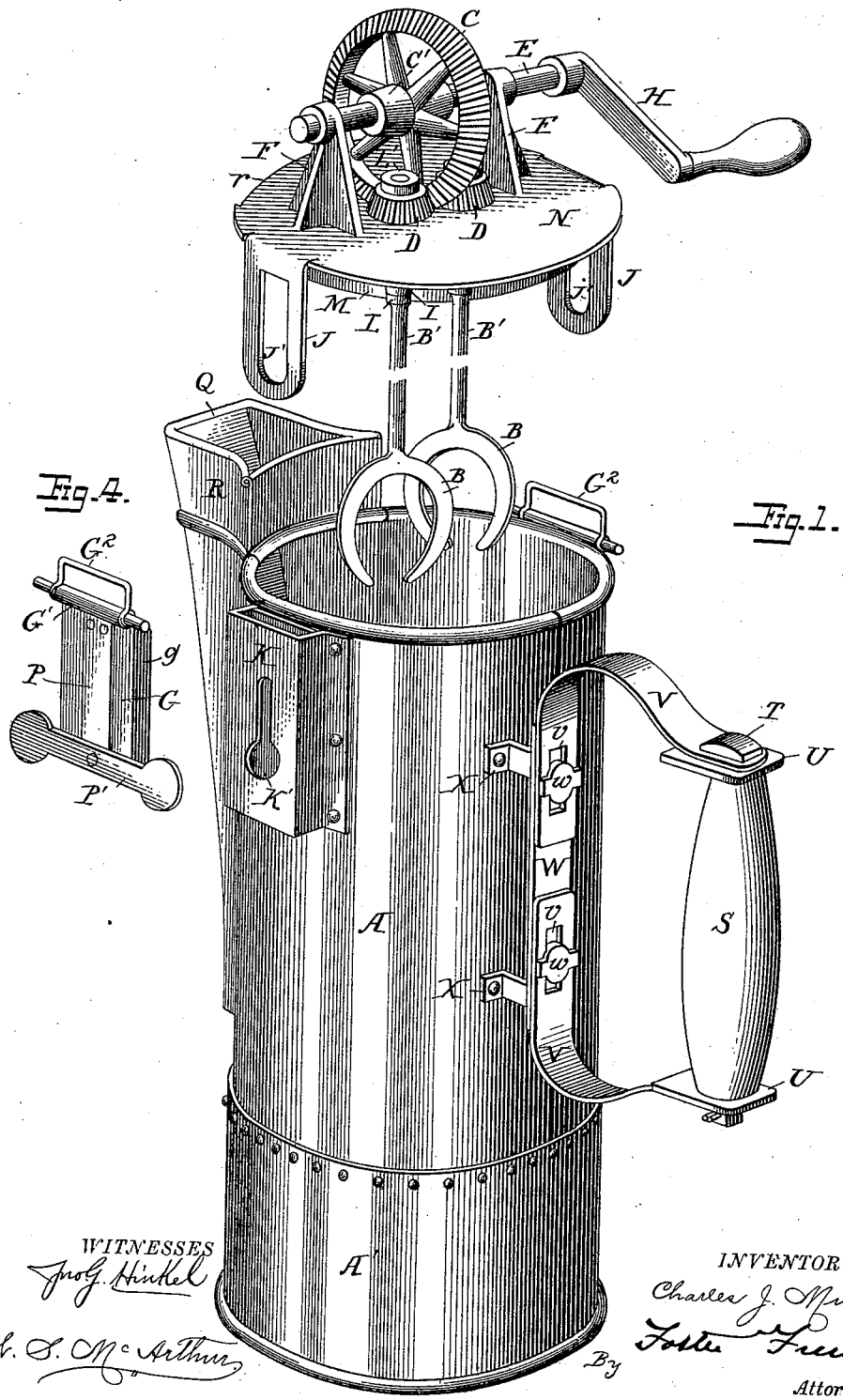

(No Model.)    C. J. MULFORD.    2 Sheets—Sheet 1.
CHOCOLATE POT.

No. 465,327.    Patented Dec. 15, 1891.

WITNESSES    INVENTOR
Charles J. Mulford.
By Foster Freeman
Attorneys (No Model.) 2 Sheets—Sheet 2.
C. J. MULFORD.
CHOCOLATE POT.
No. 465,327. Patented Dec. 15, 1891.
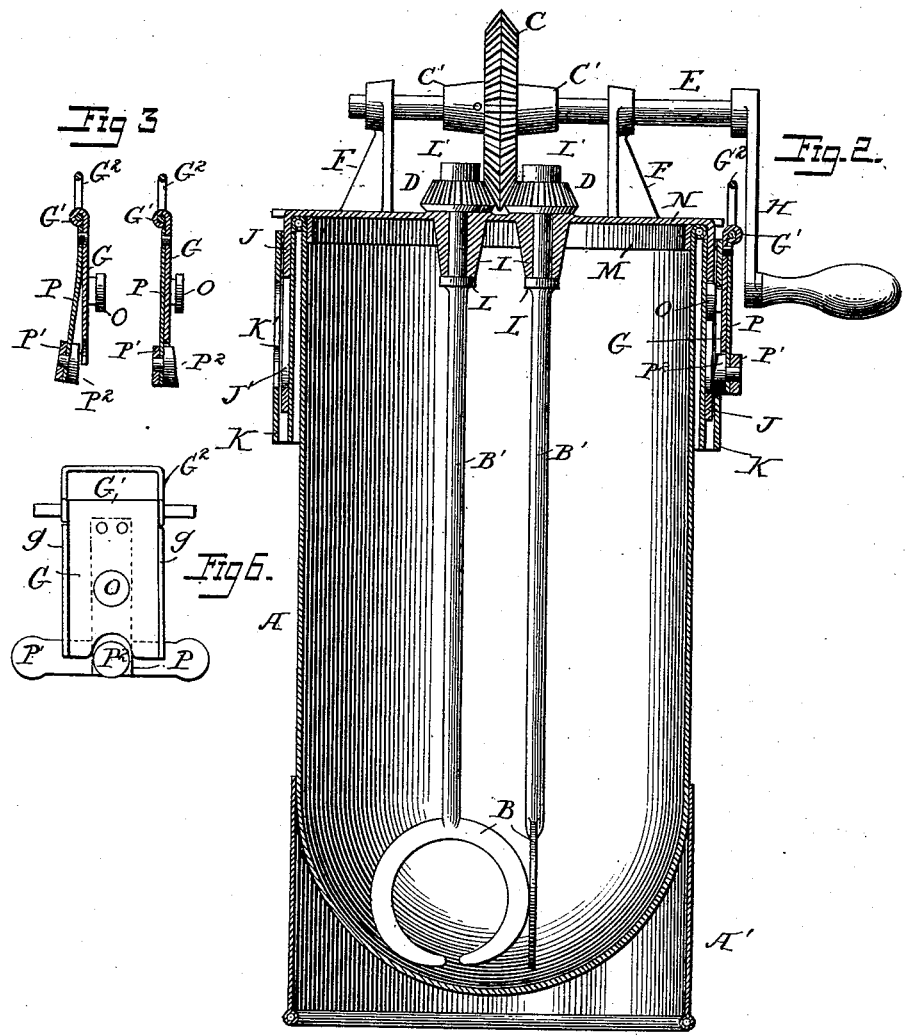
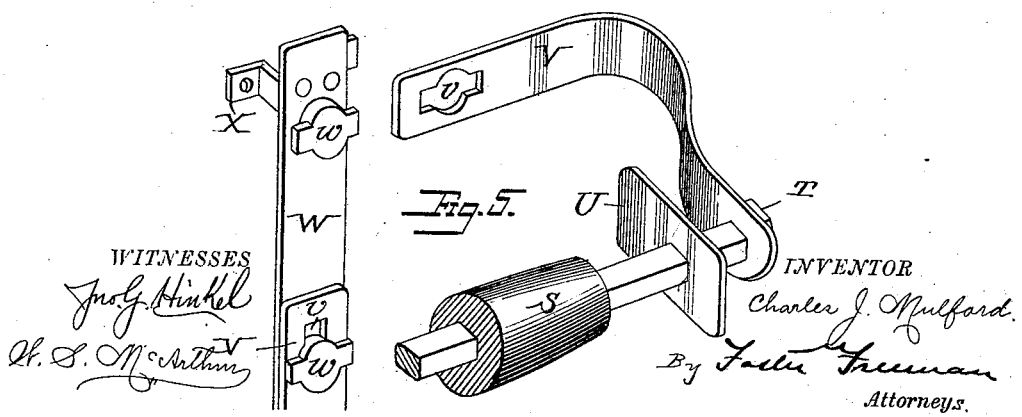
WITNESSES
Jno. G. Hinkel
H. S. McArthur
INVENTOR
Charles J. Mulford
By Foster Freeman
Attorneys.

UNITED STATES PATENT OFFICE.

CHARLES J. MULFORD, OF NEW YORK, N. Y.

CHOCOLATE-POT.

SPECIFICATION forming part of Letters Patent No. 465,327, dated December 15, 1891.

Application filed April 15, 1891. Serial No. 389,008. (No model.)

*To all whom it may concern:*

Be it known that I, CHARLES J. MULFORD, a citizen of the United States, residing at New York, in the county and State of New York, have invented certain new and useful Improvements in Chocolate-Pots, of which the following is a specification.

My invention relates to chocolate-pots, and more particularly to that class of chocolate-pots which is described and claimed in my prior application, Serial No. 375,904, filed December 19, 1890; and the object of my present invention is to improve said pots, so as to obtain cheapness and simplicity of construction, convenience, and quickness in manipulation, as well as economy of space in packing and storing said pots; and to these ends my invention consists in a pot having certain features of construction and arrangement of parts, substantially as pointed out hereinafter.

Referring to the accompanying drawings, in which the same letters of reference indicate corresponding parts in each of the figures, Figure 1 is a perspective view of a chocolate-pot, showing the puddlers detached therefrom. Fig. 2 is a vertical cross-section of the same, and Figs. 3, 4, 5, and 6 are detail views.

Having fully set forth in my prior application above referred to what I consider to be the essentials of a good chocolate-pot, it is deemed unnecessary to fully state herein or specifically describe every detail of construction which is common to both cases; but I will proceed to point out more particularly and fully describe the features of novelty in this present application.

The general shape of the pot A is that of a cylinder about twice as long or high as it is wide and with one end open at the top and the other or the bottom closed and made inverted-dome shaped, as shown in Fig. 2, for reasons which are more clearly set forth in my former application. This pot or vessel A, when provided with an inverted-dome shaped bottom, is mounted upon or has attached thereto a heat confining and supporting ring A', and it is preferably provided with a spout for pouring the liquid, having a flat front portion Q attached to the vessel by means of the side wings R, which are preferably made slightly concave, and the bottom of the spout is curved to fit the side of the vessel, while the mouth preferably extends somewhat above the level of the top of the vessel, and is plated or finished in any desirable manner, preferably as set forth in my above-named application.

In my former application the vessel was provided with a cover fitting the top, the said cover having an opening in its center for the passage of the puddlers, which were mounted upon and attached to a separate frame-work, and there was a false covering fitting the opening in the main cover, and the whole was adapted to be attached and secured to the vessel by means of legs. While such construction is especially adapted to pots of a certain size, I have found that in smaller pots it is unnecessary to have these parts separated and mounted in the manner shown in my former application, and that considerable expense can be saved by making the parts in the manner I am about to describe, and I therefore preferably use my improved arrangement on pots of smaller size, where it is desirable to lessen expense, and still furnish a vessel adapted to make good chocolate to carry out the essential features of my general theory of making chocolate.

In the present instance I provide a cover N, having an outline corresponding with the rim of the vessel A, it being provided with a notch $r$ to fit the spout R, and also connected to and forming a part of the cover are the legs J, having the slots J', which are adapted to fit within the ears K, secured upon the sides of the vessel, and to hold the cover and its attachments in position. The cover is further provided on its under side with a metallic rim M, which is soldered or otherwise secured thereto, and is adapted to fit closely on the inside of the open end of the vessel A, so as not only to prevent the fluid spilling out, but also to assist in furnishing a good stiff bearing for the cover and to prevent its being displaced or wiggling when the puddling devices are operated.

It will be seen on reference to Fig. 2 that the rim M fits closely on the inside of the open end of the vessel, while the legs J fit as closely on the outside of the vessel, are extended down into the ears K, and secured therein in a manner hereinafter set forth, so that a firm and solid foundation is offered for the support of the puddling devices.

As in my other application, I preferably make use of puddlers B B, of substantially circular form, arranged at right angles to each other and connected with the rods B' B', which are mounted in perforated projections I, extending below and preferably forming a part of the cover N and forming bearings for the puddling-rods B', thus forming a substantial bearing for the puddling devices, and all of which has been heretofore more fully set forth in my former application, Serial No. 375,904, filed December 19, 1890.

Inasmuch as my new combination-cover and legs herein fully described practically dispense with the cross-bar and web-expansion more fully set forth in my former application, it is manifest that by thus consolidating said web-expansion with the cross-bar my new combination-cover thereby formed must admit the further substitution of a solid integral casting, whenever preferable, for the entire several parts.

The mechanism for operating the puddlers consists, essentially, of a double-beveled gear-wheel C, meshing with two beveled pinions D D, the wheel C being secured upon a shaft E, which is journaled in bearings of the standards F F, which are secured to or mounted upon the upper face of the cover N. This construction of the double-beveled gear-wheel engaging both pinions has many advantages, among which may be mentioned that it admits the use of small pinions, which can be made cheaply in proportion, and also to provide long hubs C' for the double-beveled gear, which furnishes a better bearing and causes the gear to run more true, and at the same time it permits the puddling-rods to be arranged more closely together and to be more rapidly rotated, all of which are special advantages in the use of small vessels.

It will be understood, of course, that the shaft E is provided with suitable means for rotating it and its double-beveled gear, as a handle H, and it will be readily seen that all of the puddling mechanism is mounted on or forms a part of the cover N, so that it may be readily removed bodily for the purpose of filling the vessel or cleaning the parts.

In order that the cover and its attachments may be securely held in position on the vessel and yet may be readily removed, as above stated, I provide the ears K, which are secured to the side of the vessel with a clamping device, consisting, essentially, of a plate G, having flanges $g$ at its longitudinal edges, and provided on its inner side with a stud or button O, fitting the slot K' in the ear K. The upper part of the clamp is preferably turned over, as shown at G', to form a bearing for the loop $G^2$, to which any suitable handle or strap may be attached for carrying or supporting the body. Attached to the body G of the clamp is a spring-bar P, having a cross-bar P' attached to its free end for the purpose of conveniently operating the same, and secured upon the under side of the free end of the spring P is a lug or projection $P^2$, which also enters the slots K' in the ear K and holds the sliding clamp in position, and at the same time when the top N is connected to the vessel the projection or lug $P^2$ enters the slot J' of the legs J and locks the cover on the pot. When it is desired to remove the top, the spring P is forced outward by pressure on the ends of the cross-bar P', and the projection $P^2$ is lifted out of the slot K', when the clamp is slid downward until the button or stud O is removed from the slot K' and the clamp becomes detached, and the top can then be readily lifted from the vessel.

In order to manipulate the pot when in use without danger of the heat being conveyed to the hand, I provide an improved handle, which avoids this objection, and at the same time provides a detachable and portable non-conducting handle, which can be cheaply made of any kind of metal or other desirable material and secured to the sides of the vessel. The handle, which is preferably of wood, gutta-percha, or similar non-conducting material, is preferably supported upon a square pin or bolt T, preferably of metal, passing through it to prevent wabbling, and is provided with guards U, of wood, ivory, or similar non-conducting material, arranged on the bolt at the ends of the handle. Also, connected to the bolt are the bands V V, which are preferably of spring metal, and their free ends are secured to the ends of the square bolt T, while their other ends are mounted upon a fixed bridge-piece W, which is preferably attached to legs X X, secured to the body of the vessel, spanning the joint or seam therein. These spring-bands are detachably connected to the bridge by means of buttons $w$, fitting into corresponding openings $v$ in the bands, and it will be readily understood that when the handle S is removed by withdrawing the bolt T the bands V may be turned at right angles, so that the opening $y$ will correspond with the ears on the button $w$, and the bands can be removed; but when they are turned in the position shown in the drawings the ears on the buttons $w$ securely hold them in place, making a substantially detachable fastening for the handle, and as the bridge-piece is supported some distance from the vessel and the handle B is isolated from the connecting-bands by the guards U there is very little, if any, heat conducted to the handle, and it may be manipulated without danger to the operator.

While I have thus described my improvements as applied more particularly to small chocolate-pots, it will be understood that they may be used in other connections or relations, either as a whole or separately, in combination with other equivalent devices.

What I claim is—

1. A chocolate-pot the cover of which is provided with means for connecting it to the pot and having mounted thereon the puddling-bars provided with beveled pinions and a shaft supported in standards on the cover and carrying a double-beveled gear-wheel engaging the pinions, substantially as described.

2. A chocolate-pot the cover of which carries the puddling device, a gear for operating the same, the cover being provided with slotted legs, ears mounted on the sides of the pot, and a locking device fitting the ears and engaging the slotted legs to secure the cover in position, substantially as described.

3. A chocolate-pot the cover of which consists, essentially, of a plate having downward-extending legs at the side, a rim secured to the under side thereof and fitting the mouth of the pot, projections extending from the cover and carrying puddler-rods, beveled pinions mounted on said rods, standards attached to the top of the cover supporting a shaft and carrying a double-beveled gear-wheel engaging the pinions, and the whole being adapted to be removable from the pot, substantially as described.

4. In a chocolate-pot, the combination, with the vessel having ears on its side, of a cover having slotted legs entering the ears and a locking device consisting of the slide provided with a button entering the slot in the ear, and a spring provided with a projection, also fitting the slot in the ear, substantially as described.

5. The combination, with a chocolate-pot having ears on its sides, of a cover fitting the pot and having slotted legs, and a locking device consisting of the slide having upturned edges fitting the ear, a button on the inner side of the slide, engaging the slot in the ear, a spring attached to the slide and having a cross-bar for operating it, and a projection attached to the spring, fitting the slot in the ear and engaging the slotted legs of the cover, substantially as described.

6. A chocolate-pot having a bridge-piece secured to its side by legs and a non-conducting handle connected to said bridge-piece by means of detachable spring-bands, substantially as described.

7. A chocolate-pot having a bridge-piece secured to its sides by legs, detachable spring-bands secured to the bridge-piece by buttons passing through slots in said bands, a bolt passing through the ends of the bands, a non-conducting handle mounted on the bolt, and non-conducting guard-pieces between the handles and the bands, substantially as described.

In testimony whereof I have signed my name to this specification in the presence of two subscribing witnesses.

CHARLES J. MULFORD.

Witnesses:
EDWARD K. ANDERTON,
E. M. TAYLOR.